(12) United States Patent
Wang et al.

(10) Patent No.: US 10,224,931 B1
(45) Date of Patent: Mar. 5, 2019

(54) CURRENT-MODE PUF CIRCUIT BASED ON REFERENCE CURRENT SOURCE

(71) Applicant: Ningbo University, Zhejiang (CN)

(72) Inventors: Pengjun Wang, Zhejiang (CN); Gang Li, Zhejiang (CN); Huihong Zhang, Zhejiang (CN)

(73) Assignee: Ningbo University, Zhejiang (CN)

( * ) Notice: Subject to any disclaimer, the term of this patent is extended or adjusted under 35 U.S.C. 154(b) by 0 days.

(21) Appl. No.: 16/039,351

(22) Filed: Jul. 19, 2018

(30) Foreign Application Priority Data

Sep. 28, 2017 (CN) .......................... 2017 1 0894913

(51) Int. Cl.
*H03K 19/00* (2006.01)
*H04L 9/32* (2006.01)
*H03K 19/003* (2006.01)
*H03K 19/177* (2006.01)
*H04L 9/08* (2006.01)

(52) U.S. Cl.
CPC . *H03K 19/00315* (2013.01); *H03K 19/17768* (2013.01); *H04L 9/0866* (2013.01); *H04L 9/32* (2013.01); *H04L 9/3278* (2013.01)

(58) Field of Classification Search
CPC .......... H03K 19/00315; H03K 19/003; H03K 19/17768; H03K 19/0948; H04L 9/3278; H04L 2209/12; H04L 9/002; H04L 9/32
See application file for complete search history.

(56) References Cited

U.S. PATENT DOCUMENTS

| | | | | |
|---|---|---|---|---|
| 8,458,189 | B1* | 6/2013 | Ludwig | G06F 17/30038 706/20 |
| 8,912,817 | B2* | 12/2014 | Wang | H03K 19/17756 326/38 |
| 9,088,278 | B2* | 7/2015 | Pfeiffer | H03K 19/003 |
| 9,184,751 | B2* | 11/2015 | Pfeiffer | H03K 19/003 |
| 9,337,837 | B2* | 5/2016 | Pfeiffer | H03K 19/003 |
| 9,350,354 | B2* | 5/2016 | Wang | H03K 19/0948 |
| 9,584,329 | B1* | 2/2017 | Trimberger | H04L 9/3278 |
| 9,774,327 | B1* | 9/2017 | Wang | H03K 19/00315 |
| 9,948,464 | B1* | 4/2018 | Wang | G06F 7/58 |
| 2018/0337793 | A1* | 11/2018 | Park | H04L 9/3278 |

* cited by examiner

*Primary Examiner* — Vibol Tan
(74) *Attorney, Agent, or Firm* — JCIPRNET (57) ABSTRACT

A current-mode PUF circuit based on a reference current source comprises an input register, the reference current source, a deviation current comparator and a timing controller. The input register is used for ensuring synchronization of the input challenges to avoid influences of asynchronous challenges on output responses. The reference current source generates a reference current for temperature and voltage compensation. A deviation current source array generates two paths of deviation currents under the control of the input challenges. The deviation current comparator generates and outputs a judgement according to the magnitude of the current provided by the deviation current source array. The timing controller is used for generating timing information for operation of the PUF circuit. The invention has the following advantages: the deviation current source array outputs deviation currents with high robustness and high reliability. Simulation results show that the PUF circuit of the invention has good uniqueness and high reliability of 99.6% when operating under difference temperatures (−40~120° C.) and different voltages (1.08~1.32V).

3 Claims, 5 Drawing Sheets

CURRENT-MODE PUF CIRCUIT BASED ON REFERENCE CURRENT SOURCE

CROSS-REFERENCE TO RELATED APPLICATION

This application claims the priority benefit of China application serial no. 201710894913.6, filed on Sep. 28, 2017. The entirety of the above-mentioned patent application is hereby incorporated by reference herein and made a part of this specification.

BACKGROUND OF THE INVENTION

Field of the Invention

The invention relates to a PUF circuit, in particular to a current-mode PUF circuit based on a reference current source.

Description of Related Art

With the rapid development of the internet technology, information security has drawn increasing attention. Physical Unclonable Function (PUF) circuits provide an approach for improving information security on the aspect of hardware texture characteristic. Silicon-based PUF circuits are based on the characteristic recognition technique in the integrated circuit field. By capturing manufacturing process variations through corresponding comparing mechanism, PUF can produce a large number of identifications (IDs), which have the characteristics of uniqueness and unclonability. The uniqueness refers to that a given PUF circuit has unique function performance, namely the given PUF circuit can generate unique corresponding Challenge Response Pairs (CRPs). The unclonablility refers to that it is extremely difficult to clone a PUF with the same CRPs. With uniqueness and unclonablility, the PUF circuits have broad application prospects in the information security fields such as device identification, key generation and IP protection.

Random process deviations in the integrated circuit manufacturing process are embodied as differences in current, voltage and delay on the aspect of the electrical property. According to different types of deviation signals, silicon-based PUF circuits can be divided into three classes, namely current-mode PUF circuits, voltage-mode PUF circuits and delay-mode PUF circuits. As key modules of PUF circuits, the robustness of deviation signals generated by deviation signal generation circuit has a direct influence on the reliability of the current-mode PUF circuits. At present, the deviation signal generation circuits of the PUF circuits are designed based on geometric dimension deviations and process parameter deviations (such as the doping concentration, the oxide layer thickness and the diffusion depth) of MOS transistors in the integrated circuit manufacturing process. However, existing PUF circuits have defects in design of deviation signal generation circuits, and consequentially, the robustness of deviation signals is low. For example, the deviation signal generation circuits, for generating delay deviation signals, of Arbiter-PUF circuits are constructed based on switching delay cell, but the switching delay cells are likely to be affected by PVT, resulting in poor robustness of generated delay deviation signals. The deviation signal generation circuits, for generating frequency deviation signals, of RO-PUF circuits are constructed based on ring oscillators, but the ring oscillators are temperature sensitive, resulting in poor robustness of generated frequency deviation signals. The deviation signal generation circuits, used for generating current deviation signals, of SRAM-PUF circuits are constructed based on cross-coupling inverters, but the structure can generate positive feedback effect and is extremely sensitive to environment changes in the evaluation stage, thereby being poor in robustness. Due to the poor robustness of the deviation signal generation circuits, the reliability of the existing PUF circuits should be improved urgently.

SUMMARY OF THE INVENTION

The technical issue to be settled by the invention is to provide a high-reliability current-mode PUF circuit based on a reference current source.

Technical solutions used by the invention to settle aforesaid technical issue are stated as follows: A current-mode PUF circuit based on a reference current source comprises a timing controller, an input register, a deviation current comparator and a deviation signal generation circuit. The timing controller is provided with a clock terminal, a setting terminal, a $1^{st}$ output terminal and a $2^{nd}$ output terminal. Clock control signals are to be accessed to the clock terminal of the timing controller. Setting signals are to be accessed to the setting terminal of the timing controller. The input register is provided with an enable terminal, an input terminal and m output terminals, and m is an integer greater than or equal to 2. The deviation current comparator is provided with a power terminal, an enable terminal, a $1^{st}$ input terminal, a $2^{nd}$ input terminal and an output terminal. The $1^{st}$ output terminal of the timing controller is connected to the enable terminal of the input register. The $2^{nd}$ output terminal of the timing controller is connected to the enable terminal of the deviation current comparator. The input terminal of the input register is the input terminal of the current-mode PUF circuit based on the reference current source. The output terminal of the deviation current comparator is the output terminal of the current-mode PUF circuit based on the reference current source. The deviation signal generation circuit comprises a deviation current source array and the reference current source. The deviation current source array is provided with m input terminals, a $1^{st}$ bias terminal, a $2^{nd}$ bias terminal, a $1^{st}$ output terminal and a $2^{nd}$ output terminal. The reference current source is provided with a power terminal, a $1^{st}$ output terminal and a $2^{nd}$ output terminal.

The reference current source comprises a $1^{st}$ PMOS transistor, a $2^{nd}$ PMOS transistor, a $3^{rd}$ PMOS transistor, a $4^{th}$ PMOS transistor, a $5^{th}$ PMOS transistor, a $6^{th}$ PMOS transistor, a $7^{th}$ PMOS transistor, a $1^{st}$ NMOS transistor, a $2^{nd}$ NMOS transistor, a $3^{rd}$ NMOS transistor, a $4^{th}$ NMOS transistor, a $5^{th}$ NMOS transistor, a $6^{th}$ NMOS transistor, a $7^{th}$ NMOS transistor, an $8^{th}$ NMOS transistor, a $9^{th}$ NMOS transistor and a resistor. The source of the $1^{st}$ PMOS transistor, the source of the $2^{nd}$ PMOS transistor, the source of the $3^{rd}$ PMOS transistor, the source of the $4^{th}$ PMOS transistor and the source of the $5^{th}$ PMOS transistor are connected, and the connecting terminal is the power terminal of the reference current source, and the power terminal of the reference current source is to be accessed to an external power supply. The gate of the $1^{st}$ PMOS transistor, the drain of the $3^{rd}$ PMOS transistor, the gate of the $3^{rd}$ PMOS transistor, the gate of the $4^{th}$ PMOS transistor and the gate of the $5^{th}$ PMOS transistor are connected to one terminal of the resistor. The drain of the $1^{st}$ PMOS transistor, the drain of the $1^{st}$ NMOS transistor, the gate of the $1^{st}$ NMOS transistor and the gate of the $2^{nd}$ NMOS transistor are connected. The drain of the $2^{nd}$ PMOS transistor, the gate of the $2^{nd}$ PMOS transistor, the other terminal of the resistor, the gate of the $6^{th}$ PMOS transistor and the gate of the $7^{th}$ PMOS transistor are connected to the drain of the $3^{rd}$ NMOS transistor. The drain of the $4^{th}$ PMOS transistor is connected to the source of the $6^{th}$ MPOS transistor. The drain of the $5^{th}$ PMOS transistor is connected to the source of the $7^{th}$ PMOS transistor. The source of the $1^{st}$ NMOS transistor, the drain of the $2^{nd}$ NMOS transistor, the gate of the $3^{rd}$ NMOS transistor and the gate of the $4^{th}$ NMOS transistor are connected to the gate of the $5^{th}$ NMOS transistor, and the connecting terminal is the $1^{st}$ output terminal of the reference current source. The source of the $2^{nd}$ NMOS transistor and the drain of the $6^{th}$ NMOS transistor are connected to the gate of the $6^{th}$ NMOS transistor. The source of the $3^{rd}$ NMOS transistor is connected to the drain of the $7^{th}$ NMOS transistor. The source of the $4^{th}$ NMOS transistor is connected to the drain of the $8^{th}$ NMOS transistor. The drain of the $4^{th}$ NMOS transistor, the drain of the $6^{th}$ PMOS transistor and the gate of the $7^{th}$ NMOS transistor are connected to the gate of the $8^{th}$ NMOS transistor. The source of the $5^{th}$ NMOS transistor is connected to the drain of the $9^{th}$ NMOS transistor. The drain of the $5^{th}$ NMOS transistor and the drain of the $7^{th}$ PMOS transistor are connected to the gate of the $9^{th}$ NMOS transistor, and the connecting terminal is the $2^{nd}$ output terminal of the reference current source. The source of the $6^{th}$ NMOS transistor, the source of the $7^{th}$ NMOS transistor and the source of the $8^{th}$ NMOS transistor are connected to the source of the $9^{th}$ NMOS transistor, the connecting terminal is the ground terminal of the reference current source, and the ground terminal of the reference current source is grounded.

The ratio of the width-to-length ratio of the $3^{rd}$ PMOS transistor to the width-to-length ratio of the $4^{th}$ PMOS transistor is 1:1.

The ratio of the width-to-length ratio of the $4^{th}$ PMOS transistor to the width-to-length ratio of the $5^{th}$ PMOS transistor is 1:k, and k is an integer greater than or equal to 1.

The ratio of the width-to-length ratio of the $7^{th}$ NMOS transistor to the width-to-length ratio of the $8^{th}$ NMOS transistor is 2:1.

The $2^{nd}$ PMOS transistor is a high-threshold PMOS transistor.

The deviation current source array comprises m deviation current source cells of the same circuit structure. Each deviation current source cell comprises a $10^{th}$ NMOS transistor, a $11^{th}$ NMOS transistor, a $12^{th}$ NMOS transistor, a $13^{th}$ NMOS transistor, a $14^{th}$ NMOS transistor and a $15^{th}$ NMOS transistor, wherein the drain of the $10^{th}$ NMOS transistor is the $1^{st}$ output terminal of the deviation current source cell, and the drain of the $11^{th}$ NMOS transistor is the $2^{nd}$ output terminal of the deviation current source cell; the gate of the $10^{th}$ NMOS transistor is connected to the gate of the $11^{th}$ NMOS transistor, and the connecting terminal is the input terminal of the deviation current source cell; the source of the $10^{th}$ NMOS transistor is connected to the drain of the $12^{th}$ NMOS transistor; the source of the $11^{th}$ NMOS transistor is connected to the drain of the $13^{th}$ NMOS transistor; the gate of the $12^{th}$ NMOS transistor is connected to the gate of the $13^{th}$ NMOS transistor, and the connecting terminal is the $1^{st}$ bias terminal of the deviation current source cell; the source of the $12^{th}$ NMOS transistor is connected to the drain of the $14^{th}$ NMOS transistor; the source of the $13^{th}$ NMOS transistor is connected to the drain of the $15^{th}$ NMOS transistor; the gate of the $14^{th}$ NMOS transistor is connected to the gate of the $15^{th}$ NMOS transistor, and the connecting terminal is the $2^{nd}$ bias terminal of the deviation current source cell; and the source of the $14^{th}$ NMOS transistor is connected to the source of the $15^{th}$ NMOS transistor.

The $1^{st}$ bias terminals of the m deviation current source cells are connected, and the connecting terminal is the $1^{st}$ bias terminal of the deviation current source array. The $2^{nd}$ bias terminals of the m deviation current source cells are connected, and the connecting terminal is the $2^{nd}$ bias terminal of the deviation current source array. The $1^{st}$ output terminals of the m bias current source cells are connected, and the connecting terminal is the $1^{st}$ output terminal of the deviation current source array. The $2^{nd}$ output terminals of the m deviation current source cells are connected, and the connecting terminal is the $2^{nd}$ output terminal of the deviation current source array. The input terminals of the m deviation current source cells are the m input terminals of the deviation current source array.

The $1^{st}$ bias terminal of the deviation current source array is connected to the $1^{st}$ output terminal of the reference current source, and the $2^{nd}$ bias terminal of the deviation current source array is connected to the $2^{nd}$ output terminal of the reference current source.

The $1^{st}$ output terminal of the deviation current source array is the $1^{st}$ output terminal of the deviation signal generation circuit. The $2^{nd}$ output terminal of the deviation current source array is the $2^{nd}$ output terminal of the deviation signal generation circuit. The m input terminals of the deviation current source array are m input terminals of the deviation signal generation circuit, the m input terminals of the deviation signal generation circuit are connected to the m output terminals of the input register in a one-to-one corresponding mode. The $1^{st}$ output terminal of the deviation signal generation circuit is connected to the $1^{st}$ input terminal of the deviation current comparator. The $2^{nd}$ output terminal of the deviation signal generation circuit is connected to the $2^{nd}$ input terminal of the deviation current comparator.

The deviation current comparator comprises an $8^{th}$ PMOS transistor, a $9^{th}$ PMOS transistor, a $10^{th}$ PMOS transistor, a $11^{th}$ PMOS transistor, a $1^{st}$ capacitor, a $2^{nd}$ capacitor, a $1^{st}$ inverter and a $2^{nd}$ inverter, wherein the $9^{th}$ PMOS transistor and the $10^{th}$ PMOS transistor are both low-threshold PMOS transistors; the source of the $8^{th}$ PMOS transistor, the source of the $9^{th}$ PMOS transistor and the source of the $10^{th}$ PMOS transistor are connected to the source of the $11^{th}$ PMOS transistor, and the connecting terminal is the power terminal of the deviation current comparator, and the power terminal of the deviation current comparator is to be accessed to the external power supply; the gate of the $8^{th}$ PMOS transistor is connected to the gate of the $11^{th}$ PMOS transistor, and the connecting terminal is the enable terminal of the deviation current comparator; the drain of the $8^{th}$ PMOS transistor, the drain of the $9^{th}$ PMOS transistor, the gate of the $10^{th}$ PMOS transistor and the input terminal of the $1^{st}$ inverter are connected to one terminal of the $1^{st}$ capacitor, and the connecting terminal is the $1^{st}$ input terminal of the deviation current comparator; the gate of the $9^{th}$ PMOS transistor, the drain of the $10^{th}$ PMOS transistor, the drain of the $11^{th}$ PMOS transistor and the input terminal of the $2^{nd}$ inverter are connected to one terminal of the $2^{nd}$ capacitor, and the connecting terminal is the $2^{nd}$ input terminal of the deviation current comparator; and the output terminal of the $2^{nd}$ inverter is the output terminal of the deviation current comparator, and the other terminal of the $1^{st}$ capacitor and the other terminal of the $2^{nd}$ capacitor are grounded. In the circuit, the deviation current comparator generates an output response according to the magnitude of an input current. In the circuit, the 9$^{th}$ PMOS transistor and the 10$^{th}$ PMOS transistor form a pair of low-threshold cross-coupled PMOS transistors, and the 1$^{st}$ capacitor and the 2$^{nd}$ capacitor form a pair of node capacitors. The judgment process is divided into a precharging stage, a signal amplification stage and an evaluation stage. In the precharging stage, a node A and a node B are accessed to the external power supply VDD through an enable signal SAEN; when the enable signal SAEN reaches a high level, the node A and the node B are released, and the signal amplification stage starts; when currents ($I_A$ and $I_B$) are output from branches on the two sides of the deviation current comparator, the node capacitors, namely the 1$^{st}$ capacitor and the 2$^{nd}$ capacitor, start to discharge, and the higher the discharge currents, the faster the voltages of the nodes on the corresponding sides drop; and the 9$^{th}$ responsive PMOS transistor or the 10$^{th}$ responsive PMOS transistor will be turned on no matter the voltage of which node drops to VDD+$V_{TH}$ ($V_{TH}$ is the threshold voltage of the 9$^{th}$ PMOS transistor and the 10$^{th}$ PMOS transistor) first, the evaluation stage starts at the moment, the deviation current comparator rapidly generates an output response according to positive feedback, and thus a response signal is output rapidly and accurately. The circuit is simple in structure, rapid in output response and high in precision.

The threshold voltage of the 2$^{nd}$ PMOS transistor is 613 mV.

Compared with the prior art, the invention has the following advantages: The PUF circuit is composed of the input register, the reference current source, the deviation current source array, the deviation current comparator and the timing controller, wherein the input register is used for ensuring the synchronization of input challenges so as to avoid the influence of asynchronous challenges on the output response, the reference current source generates a reference current for temperature and voltage compensation, the deviation current source array generates two paths of deviation currents controlled by the challenges, the deviation current comparator generates and outputs a judgment according to the magnitude of the deviation current provided by the deviation current source array, and the timing controller is used for generating timing information for operation of the PUF circuit; the reference current source comprises the 1$^{st}$ PMOS transistor, the 2$^{nd}$ PMOS transistor, the 3$^{rd}$ PMOS transistor, the 4$^{th}$ PMOS transistor, the 5$^{th}$ PMOS transistor, the 6$^{th}$ PMOS transistor, the 7$^{th}$ PMOS transistor, the 1$^{st}$ NMOS transistor, the 2$^{nd}$ NMOS transistor, the 3$^{rd}$ NMOS transistor, the 4$^{th}$ NMOS transistor, the 5$^{th}$ NMOS transistor, the 6$^{th}$ NMOS transistor, the 7$^{th}$ NMOS transistor, the 8$^{th}$ NMOS transistor, the 9$^{th}$ NMOS transistor and the resistor; the deviation current source array comprises the m deviation current source cells of the same circuit structure; each deviation current source cell comprises the 10$^{th}$ NMOS transistor, the 11$^{th}$ NMOS transistor, the 12$^{th}$ NMOS transistor, the 13$^{th}$ NMOS transistor, the 14$^{th}$ NMOS transistor and the 15$^{th}$ NMOS transistor; the reference current source generates the reference current $I_1$ which will not be affected by temperature or voltage fluctuation and adopts MOS transistors with different threshold voltages to achieve temperature compensation; the resistor serves as a voltage division resistor, the 2$^{nd}$ PMOS transistor is a high-threshold PMOS transistor, the 3$^{rd}$ PMOS transistor is a normal-threshold PMOS transistor, and the threshold voltages of the 2$^{nd}$ PMOS transistor and the 3$^{rd}$ PMOS transistor have the same temperature coefficient; as the ratio of the width-to-length ratio of the 3$^{rd}$ PMOS transistor to the width-to-length ratio of the 4$^{th}$ PMOS transistor is 1:1 and the ratio of the width-to-length ratio of the 7$^{th}$ NMOS transistor to the width-to-length ratio of the 8$^{th}$ NMOS transistor is 2:1, the current across the 7$^{th}$ NMOS transistor and the current across the 8$^{th}$ NMOS transistor are 2$I_1$ and $I_1$ respectively, the current across the 3$^{rd}$ PMOS transistor and the current across the 4$^{th}$ PMOS transistor are both $I_1$, in this way, the current $I_1$ across the 2$^{nd}$ PMOS transistor is only related to the temperature coefficient of the resistor R1, and when resistors with different temperature coefficients are connected in series to form the resistor R1 with a first-order zero-temperature coefficient, the current $I_1$ will not be affected by the first-order zero-temperature coefficient; as the ratio of the width-to-length ratio of the 4$^{th}$ PMOS transistor to the width-to-length ratio of the 5$^{th}$ PMOS transistor is 1:k, the magnitude of the current $I_{REF}$ output by the 2$^{nd}$ output terminal of the reference current source is $kI_1$; the deviation current source array is composed of the m deviation current cells of the completely identical structure, the current $i_a$ and the current $i_b$ of each deviation current source cell are obtained by copying the reference current generated by the reference current source $I_1$, and thus the deviation current source are insensitive to temperature and voltage fluctuation; as m current sources have completely identical design parameters and share the bias voltages ($V_{b1}$ and $V_{b2}$) output by the deviation current source, the output currents of the deviation current source cells are equal theoretically; however, random deviations inevitably exist between the deviation current cells under the influence of process deviations, and thus the magnitudes of the copied currents are different (due to the process deviations); when the 9$^{th}$ PMOS transistor and the 10$^{th}$ PMOS transistor of each deviation current source cell are connected, the amplitude of the current source hardly changes, namely the currents copied by the deviation current source cells do not change along with the voltage change, and the deviation current source array with random deviations is controlled by challenges ($d_1, d_2, \ldots, d_m$) output by the input register, and finally, deviation current signals $I_A, I_B$ are generated and output; as the current $i_a$ and the current $i_b$ in each deviation current source cell are spatially adjacent, global variations between the current $i_a$ and the current $i_b$ can be eliminated to prevent influences on $I_A$ and $I_B$, and thus the robustness is high. Therefore, the PUF circuit of the invention has high reliability, the circuit layout of the invention is designed through a full customization method based on the TSMC-LP 65 nm CMOS process, and the circuit has an area of 38 μm46 μm and the average power consumption of 25.7 μW (@100 MHz). Experimental results show that the PUF circuit of the invention has good uniqueness and high reliability of 99.6% when operating under different temperature (−40~120° C.) and different voltages of (1.08-1.32V).

DESCRIPTION OF THE EMBODIMENTS

The invention is further described as follows in combination with drawings and embodiments.

First Embodiment

As is shown in FIGS. 1-4, a current-mode PUF circuit based on a reference current source 5 comprises a timing controller 1, an input register 2, a deviation current comparator 3 and a deviation signal generation circuit. The timing controller 1 is provided with a clock terminal, a setting terminal, a $1^{st}$ output terminal and a $2^{nd}$ output terminal. Clock control signals are to be accessed to the clock terminal of the timing controller 1. Setting signals are to be accessed to the setting terminal of the timing controller 1. The input register 2 is provided with an enable terminal, an input terminal and m output terminals, and m is an integer greater than or equal to 2. The deviation current comparator 3 is provided with a power terminal, an enable terminal, a $1^{st}$ input terminal, a $2^{nd}$ input terminal and an output terminal. The $1^{st}$ output terminal of the timing controller 1 is connected to the enable terminal of the input register 2. The $2^{nd}$ output terminal of the timing controller 1 is connected to the enable terminal of the deviation current comparator 3. The input terminal of the input register 2 is the input terminal of the current-mode PUF circuit based on the reference current source 5. The output terminal of the deviation current comparator 3 is the output terminal of the current-mode PUF circuit based on the reference current source 5. The deviation signal generation circuit comprises a deviation current source array 4 and the reference current source 5. The deviation current source array 4 is provided with m input terminals, a $1^{st}$ bias terminal, a $2^{nd}$ bias terminal, a $1^{st}$ output terminal and a $2^{nd}$ output terminal. The reference current source 5 is provided with a power terminal, a $1^{st}$ output terminal and a $2^{nd}$ output terminal. The reference current source 5 comprises a $1^{st}$ PMOS transistor P1, a $2^{nd}$ PMOS transistor P2, a $3^{rd}$ PMOS transistor P3, a $4^{th}$ PMOS transistor P4, a $5^{th}$ PMOS transistor P5, a $6^{th}$ PMOS transistor P6, a $7^{th}$ PMOS transistor P7, a $1^{st}$ NMOS transistor N1, a $2^{nd}$ NMOS transistor N2, a $3^{rd}$ NMOS transistor N3, a $4^{th}$ NMOS transistor N4, a $5^{th}$ NMOS transistor N5, a $6^{th}$ NMOS transistor N6, a $7^{th}$ NMOS transistor N7, an $8^{th}$ NMOS transistor N8, a $9^{th}$ NMOS transistor N9 and a resistor R1. The source of the $1^{st}$ PMOS transistor P1, the source of the $2^{nd}$ PMOS transistor P2, the source of the $3^{rd}$ PMOS transistor P3, the source of the $4^{th}$ PMOS transistor P4 and the source of the $5^{th}$ PMOS transistor P5 are connected, and the connecting terminal is the power terminal of the reference current source 5, and the power terminal of the reference current source 5 is to be accessed to an external power supply VDD. The gate of the $1^{st}$ PMOS transistor P1, the drain of the $3^{rd}$ PMOS transistor P3, the gate of the $3^{rd}$ PMOS transistor P3, the gate of the $4^{th}$ PMOS transistor P4 and the gate of the $5^{th}$ PMOS transistor P5 are connected to one terminal of the resistor R1. The drain of the $1^{st}$ PMOS transistor P1, the drain of the $1^{st}$ NMOS transistor N1, the gate of the $1^{st}$ NMOS transistor N1 and the gate of the $2^{nd}$ NMOS transistor N2 are connected. The drain of the $2^{nd}$ PMOS transistor P2, the gate of the $2^{nd}$ PMOS transistor P2, the other terminal of the resistor R1, the gate of the $6^{th}$ PMOS transistor P6 and the gate of the $7^{th}$ PMOS transistor P7 are connected to the drain of the $3^{rd}$ NMOS transistor N3. The drain of the $4^{th}$ PMOS transistor P4 is connected to the source of the $6^{th}$ MPOS transistor P6. The drain of the $5^{th}$ PMOS transistor P5 is connected to the source of the $7^{th}$ PMOS transistor P7. The source of the NMOS transistor N1, the drain of the $2^{nd}$ NMOS transistor N2, the gate of the $3^{rd}$ NMOS transistor N3 and the gate of the $4^{th}$ NMOS transistor N4 are connected to the gate of the $5^{th}$ NMOS transistor N5, and the connecting terminal is the $1^{st}$ output terminal of the reference current source 5. The source of the $2^{nd}$ NMOS transistor N2 and the drain of the $6^{th}$ NMOS transistor N6 are connected to the gate of the $6^{th}$ NMOS transistor N6. The source of the $3^{rd}$ NMOS transistor N3 is connected to the drain of the $7^{th}$ NMOS transistor N7. The source of the $4^{th}$ NMOS transistor N4 is connected to the drain of the $8^{th}$ NMOS transistor N8. The drain of the $4^{th}$ NMOS transistor N4, the drain of the $6^{th}$ PMOS transistor P6 and the gate of the $7^{th}$ NMOS transistor N7 are connected to the gate of the $8^{th}$ NMOS transistor N8. The source of the $5^{th}$ NMOS transistor N5 is connected to the drain of the $9^{th}$ NMOS transistor N9. The drain of the $5^{th}$ NMOS transistor N5 and the drain of the $7^{th}$ PMOS transistor P7 are connected to the gate of the $9^{th}$ NMOS transistor N9, and the connecting terminal is the $2^{nd}$ output terminal of the reference current source 5. The source of the $6^{th}$ NMOS transistor N6, the source of the $7^{th}$ NMOS transistor N7 and the source of the $8^{th}$ NMOS transistor N8 are connected to the source of the $9^{th}$ NMOS transistor N9, the connecting terminal of the ground terminal of the reference current source 5, and the ground terminal of the reference current source 5 is grounded. The ratio of the width-to-length ratio of the $3^{rd}$ PMOS transistor P3 to the width-to-length ratio of the $4^{th}$ PMOS transistor P4 is 1:1. The ratio of the width-to-length ratio of the $4^{th}$ PMOS transistor P4 to the width-to-length ratio of the $5^{th}$ PMOS transistor P5 is 1:k, and k is an integer greater than or equal to 1. The ratio of the width-to-length ratio of the $7^{th}$ NMOS transistor N7 to the width-to-length ratio of the $8^{th}$ NMOS transistor N8 is 2:1. The $2^{nd}$ PMOS transistor P2 is a high-threshold PMOS transistor. The deviation current source array 4 comprises m deviation current source cells of the same circuit structure. Each deviation current source cell comprises a $10^{th}$ NMOS transistor N10, a $11^{th}$ NMOS transistor N11, a $12^{th}$ NMOS transistor N12, a $13^{th}$ NMOS transistor N13, a $14^{th}$ NMOS transistor N14 and a $15^{th}$ NMOS transistor N15, wherein the drain of the $10^{th}$ NMOS transistor N10 is the $1^{st}$ output terminal of the deviation current source cell, and the drain of the $11^{th}$ NMOS transistor N11 is the $2^{nd}$ output terminal of the deviation current source cell; the gate of the $10^{th}$ NMOS transistor N10 is connected to the gate of the $11^{th}$ NMOS transistor N11, and the connecting terminal is the input terminal of the deviation current source cell; the source of the $10^{th}$ NMOS transistor N10 is connected to the drain of the $12^{th}$ NMOS transistor N12; the source of the $11^{th}$ NMOS transistor N11 is connected to the drain of the $13^{th}$ NMOS transistor N13; the gate N12 of the $12^{th}$ NMOS transistor N12 is connected to the gate of the $13^{th}$ NMOS transistor N13, and the connecting terminal is the $1^{st}$ bias terminal of the deviation current source cell; the source of the $12^{th}$ NMOS transistor N12 is connected to the drain of the $14^{th}$ NMOS transistor N14; the source of the $13^{th}$ NMOS transistor N13 is connected to the drain of the $15^{th}$ NMOS transistor N15; the gate of the $14^{th}$ NMOS transistor is connected to the gate of the $15^{th}$ NMOS transistor N15, and the connecting terminal is the $2^{nd}$ bias terminal of the deviation current source cell; and the source of the $14^{th}$ NMOS transistor N14 is connected to the source of the $15^{th}$ NMOS transistor N15. The $1^{st}$ bias terminals of the m deviation current source cells are connected, and the connecting terminal is the $1^{st}$ bias terminal of the deviation current source array 4. The $2^{nd}$ bias terminals of the m deviation current source cells are connected, and the connecting terminal is the $2^{nd}$ bias terminal of the deviation current source array 4. The $1^{st}$ output terminals of the m bias current source cells are connected, and the connecting terminal is the $1^{st}$ output terminal of the deviation current source array 4. The $2^{nd}$ output terminals of the m deviation current source cells are connected, and the connecting terminal is the $2^{nd}$ output terminal of the deviation current source array 4. The input terminals of the m deviation current source cells are the m input terminals of the deviation current source array 4. The $1^{st}$ bias terminal of the deviation current source array 4 is connected to the $1^{st}$ output terminal of the reference current source 5. The $2^{nd}$ bias terminal of the deviation current source array 4 is connected to the $2^{nd}$ output terminal of the reference current source 5. The $1^{st}$ output terminal of the deviation current source array 4 is the $1^{st}$ output terminal of the deviation signal generation circuit. The $2^{nd}$ output terminal of the deviation current source array 4 is the $2^{nd}$ output terminal of the deviation signal generation circuit. The m input terminals of the deviation current source array 4 are m input terminals of the deviation signal generation circuit, the m input terminals of the deviation signal generation circuit are connected to the m output terminals of the input register 2 in a one-to-one corresponding mode. The $1^{st}$ output terminal of the deviation signal generation circuit is connected to the $1^{st}$ input terminal of the deviation current comparator 3. The $2^{nd}$ output terminal of the deviation signal generation circuit is connected to the $2^{nd}$ input terminal of the deviation current comparator 3.

Second Embodiment

As is shown in FIGS. 1-4, a current-mode PUF circuit based on a reference current source 5 comprises a timing controller 1, an input register 2, a deviation current comparator 3 and a deviation signal generation circuit. The timing controller 1 is provided with a clock terminal, a setting terminal, a $1^{st}$ output terminal and a $2^{nd}$ output terminal. Clock controls signals are to be accessed to the clock terminal of the timing controller 1. Setting signals are to be accessed to the setting terminal of the timing controller 1. The input register 2 is provided with an enable terminal, an input terminal and m output terminals, and in is an integer greater than or equal to 2. The deviation current comparator 3 is provided with a power terminal, an enable terminal, a $1^{st}$ input terminal, a $2^{nd}$ input terminal and an output terminal. The $1^{st}$ output terminal of the timing controller 1 is connected to the enable terminal of the input register 2. The $2^{nd}$ output terminal of the timing controller 1 is connected to the enable terminal of the deviation current comparator 3. The input terminal of the input register 2 is the input terminal of the current-mode PUF circuit based on the reference current source 5. The output terminal of the deviation current comparator 3 is the output terminal of the current-mode PUF circuit based on the reference current source 5. The deviation signal generation circuit comprises a deviation current source array 4 and the reference current source 5. The deviation current source array 4 is provided with m input terminals, a $1^{st}$ bias terminal, a $2^{nd}$ bias terminal, a $1^{st}$ output terminal and a $2^{nd}$ output terminal. The reference current source 5 is provided with a power terminal, a $1^{st}$ output terminal and a $2^{nd}$ output terminal. The reference current source 5 comprises a $1^{st}$ PMOS transistor P1, a $2^{nd}$ PMOS transistor P2, a $3^{rd}$ PMOS transistor P3, a $4^{th}$ PMOS transistor P4, a $5^{th}$ PMOS transistor P5, a $6^{th}$ PMOS transistor P6, a $7^{th}$ PMOS transistor P7, a $1^{st}$ NMOS transistor N1, a $2^{nd}$ NMOS transistor N2, a $3^{rd}$ NMOS transistor N3, a $4^{th}$ NMOS transistor N4, a $5^{th}$ NMOS transistor N5, a $6^{th}$ NMOS transistor N6, a $7^{th}$ NMOS transistor N7, an $8^{th}$ NMOS transistor N8, a $9^{th}$ NMOS transistor N9 and a resistor R1. The source of the $1^{st}$ PMOS transistor P1, the source of the $2^{nd}$ PMOS transistor P2, the source of the $3^{rd}$ PMOS transistor P3, the source of the $4^{th}$ PMOS transistor P4 and the source of the $5^{th}$ PMOS transistor P5 are connected, and the connecting terminal is the power terminal of the reference current source 5. The power terminal of the reference current source 5 is to be accessed to an external power supply VDD, and the external power supply VDD is generally 1.2V. The gate of the $1^{st}$ PMOS transistor P1, the drain of the $3^{rd}$ PMOS transistor P3, the gate of the $3^{rd}$ PMOS transistor P3, the gate of the $4^{th}$ PMOS transistor P4 and the gate of the $5^{th}$ PMOS transistor P5 are connected to one terminal of the resistor R1. The drain of the $1^{st}$ PMOS transistor P1, the drain of the $1^{st}$ NMOS transistor N1, the gate of the $1^{st}$ NMOS transistor N1 and the gate of the $2^{nd}$ NMOS transistor N2 are connected. The drain of the $2^{nd}$ PMOS transistor P2, the gate of the $2^{nd}$ PMOS transistor P2, the other terminal of the resistor R1, the gate of the $6^{th}$ PMOS transistor P6 and the gate of the $7^{th}$ PMOS transistor P7 are connected to the drain of the $3^{rd}$ NMOS transistor N3. The drain of the $4^{th}$ PMOS transistor P4 is connected to the source of the $6^{th}$ MPOS transistor P6. The drain of the $5^{th}$ PMOS transistor P5 is connected to the source of the PMOS transistor P7. The source of the $1^{st}$ NMOS transistor N1, the drain of the $2^{nd}$ NMOS transistor N2, the gate of the $3^{rd}$ NMOS transistor N3 and the gate of the $4^{th}$ NMOS transistor N4 are connected to the gate of the $5^{th}$ NMOS transistor N5, and the connecting terminal is the $1^{st}$ output terminal of the reference current source 5. The source of the $2^{nd}$ NMOS transistor N2 and the drain of the $6^{th}$ NMOS transistor N6 are connected to the gate of the $6^{th}$ NMOS transistor N6. The source of the $3^{rd}$ NMOS transistor N3 is connected to the drain of the $7^{th}$ NMOS transistor N7. The source of the $4^{th}$ NMOS transistor N4 is connected to the drain of the $8^{th}$ NMOS transistor N8. The drain of the $4^{th}$ NMOS transistor N4, the drain of the $6^{th}$ PMOS transistor P6 and the gate of the $7^{th}$ NMOS transistor N7 are connected to the gate of the $8^{th}$ NMOS transistor N8. The source of the $5^{th}$ NMOS transistor N5 is connected to the drain of the $9^{th}$ NMOS transistor N9. The drain of the $5^{th}$ NMOS transistor N5 and the drain of the $7^{th}$ PMOS transistor P7 are connected to the gate of the $9^{th}$ NMOS transistor N9, and the connecting terminal is the $2^{nd}$ output terminal of the reference current source 5. The source of the $6^{th}$ NMOS transistor N6, the source of the $7^{th}$ NMOS transistor N7 and the source of the $8^{th}$ NMOS transistor N8 are connected to the source of the $9^{th}$ NMOS transistor N9, the connecting terminal of the ground terminal of the reference current source 5, and the ground terminal of the reference current source 5 is grounded. The ratio of the width-to-length ratio of the $3^{rd}$ PMOS transistor P3 to the width-to-length ratio of the $4^{th}$ PMOS transistor P4 is 1:1. The ratio of the width-to-length ratio of the $4^{th}$ PMOS transistor P4 to the width-to-length ratio of the $5^{th}$ PMOS transistor P5 is 1:k, and k is an integer greater than or equal to 1. The ratio of the width-to-length ratio of the $7^{th}$ NMOS transistor N7 to the width-to-length ratio of the $8^{th}$ NMOS transistor N8 is 2:1. The $2^{nd}$ PMOS transistor P2 is a high-threshold PMOS transistor. The deviation current source array 4 comprises m deviation current source cells of the same circuit structure. Each deviation current source cell comprises a $10^{th}$ NMOS transistor N10, a $11^{th}$ NMOS transistor N11, a $12^{th}$ NMOS transistor N12, a $13^{th}$ NMOS transistor N13, a $14^{th}$ NMOS transistor N14 and a $15^{th}$ NMOS transistor N15, wherein the drain of the $10^{th}$ NMOS transistor N10 is the $1^{st}$ output terminal of the deviation current source cell, and the drain of the $11^{th}$ NMOS transistor N11 is the $2^{nd}$ output terminal of the deviation current source cell; the gate of the $10^{th}$ NMOS transistor N10 is connected to the gate of the $11^{th}$ NMOS transistor N11, and the connecting terminal is the input terminal of the deviation current source cell; the source of the $10^{th}$ NMOS transistor N10 is connected to the drain of the $12^{th}$ NMOS transistor N12; the source of the $11^{th}$ NMOS transistor N11 is connected to the drain of the $13^{th}$ NMOS transistor N13; the gate N12 of the $12^{th}$ NMOS transistor N12 is connected to the gate of the $13^{th}$ NMOS transistor N13, and the connecting terminal is the $1^{st}$ bias terminal of the deviation current source cell; the source of the $12^{th}$ NMOS transistor N12 is connected to the drain of the $14^{th}$ NMOS transistor N14; the source of the $13^{th}$ NMOS transistor N13 is connected to the drain of the $15^{th}$ NMOS transistor N15; the gate of the $14^{th}$ NMOS transistor is connected to the gate of the $15^{th}$ NMOS transistor N15, and the connecting terminal is the $2^{nd}$ bias terminal of the deviation current source cell; and the source of the $14^{th}$ NMOS transistor N14 is connected to the source of the $15^{th}$ NMOS transistor N15. The $1^{st}$ bias terminals of the m deviation current source cells are connected, and the connecting terminal is the $1^{st}$ bias terminal of the deviation current source array 4. The $2^{nd}$ bias terminals of the m deviation current source cells are connected, and the connecting terminal is the $2^{nd}$ bias terminal of the deviation current source array 4. The $1^{st}$ output terminals of the m bias current source cells are connected, and the connecting terminal is the $1^{st}$ output terminal of the deviation current source array 4. The $2^{nd}$ output terminals of the m deviation current source cells are connected, and the connecting terminal is the $2^{nd}$ output terminal of the deviation current source array 4. The input terminals of the m deviation current source cells are the m input terminals of the deviation current source array 4. The $1^{st}$ bias terminal of the deviation current source array 4 is connected to the $1^{st}$ output terminal of the reference current source 5. The $2^{nd}$ bias terminal of the deviation current source array 4 is connected to the $2^{nd}$ output terminal of the reference current source 5. The $1^{st}$ output terminal of the deviation current source array 4 is the $1^{st}$ output terminal of the deviation signal generation circuit. The $2^{nd}$ output terminal of the deviation current source array 4 is the $2^{nd}$ output terminal of the deviation signal generation circuit. The m input terminals of the deviation current source array 4 are m input terminals of the deviation signal generation circuit, the m input terminals of the deviation signal generation circuit are connected to the m output terminals of the input register 2 in a one-to-one corresponding mode. The $1^{st}$ output terminal of the deviation signal generation circuit is connected to the $1^{st}$ input terminal of the deviation current comparator 3. The $2^{nd}$ output terminal of the deviation signal generation circuit is connected to the $2^{nd}$ input terminal of the deviation current comparator 3.

Figure 1:
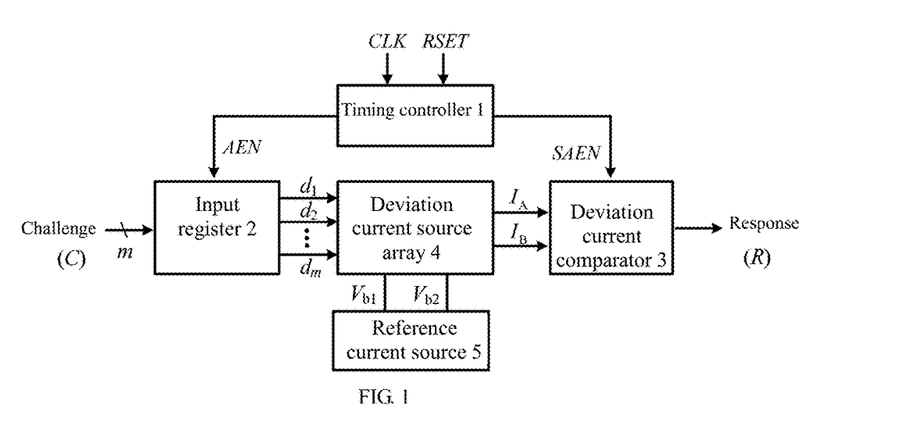
FIG. 1 is a circuit principle block diagram of the invention.
Figure 2:
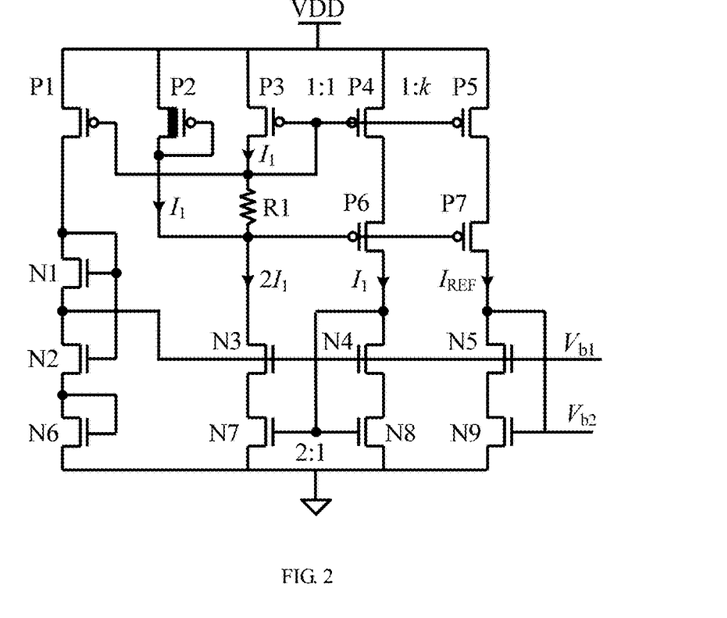
FIG. 2 is a circuit diagram of the reference current source of the invention.
Figure 3:
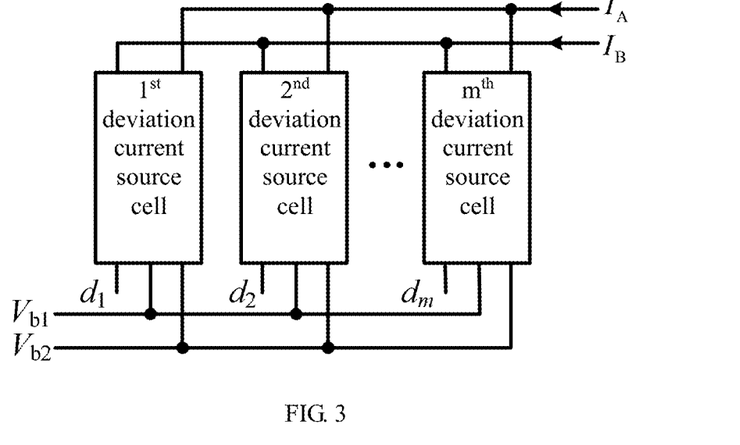
FIG. 3 is a circuit principle block diagram of a deviation current source array of the invention.
Figure 4:
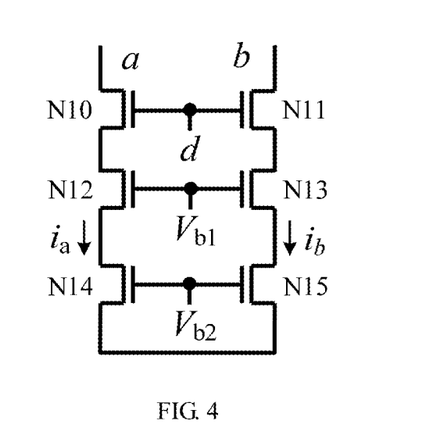
FIG. 4 is a circuit diagram of a deviation current source cell of the invention.
Figure 5:
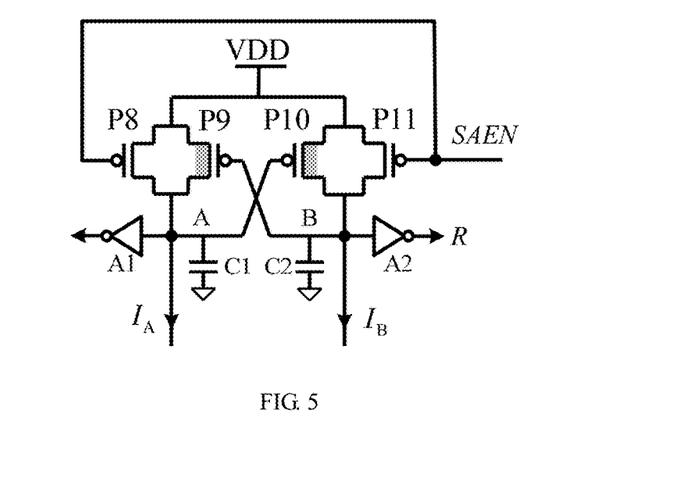
FIG. 5 is a circuit diagram of a deviation current comparator of the invention.

As is shown in FIG. 5, in this embodiment, the deviation current comparator 3 comprises an $8^{th}$ PMOS transistor P8, a $9^{th}$ PMOS transistor P9, a $10^{th}$ PMOS transistor P10, a $11^{th}$ PMOS transistor, a $1^{st}$ capacitor C1, a $2^{nd}$ capacitor C2, a $1^{st}$ inverter A1 and a $2^{nd}$ inverter A2, wherein the $9^{th}$ PMOS transistor P9 and the $10^{th}$ PMOS transistor P10 are both low-threshold PMOS transistors; the source of the $8^{th}$ PMOS transistor P8, the source of the $9^{th}$ PMOS transistor P9 and the source of the $10^{th}$ PMOS transistor P10 are connected to the source of the $11^{th}$ PMOS transistor, and the connecting terminal is the power terminal of the deviation current comparator 3, and the power terminal of the deviation current comparator 3 is to be accessed to the external power supply VDD; the gate of the $8^{th}$ PMOS transistor P8 is connected to the gate of the $11^{th}$ PMOS transistor, and the connecting terminal is the enable terminal of the deviation current comparator 3; the drain of the $8^{th}$ PMOS transistor P8, the drain of the $9^{th}$ PMOS transistor P9, the gate of the $10^{th}$ PMOS transistor P10 and the input terminal of the $1^{st}$ inverter A1 are connected to one terminal of the $1^{st}$ capacitor, and the connecting terminal is the $1^{st}$ input terminal of the deviation current comparator 3; the gate of the $9^{th}$ PMOS transistor P9, the drain of the $10^{th}$ PMOS transistor P10, the drain of the $11^{th}$ PMOS transistor and the input terminal of the $2^{nd}$ inverter A2 are connected to one terminal of the $2^{nd}$ capacitor, and the connecting terminal is the $2^{nd}$ input terminal of the deviation current comparator 3; and the output terminal of the $2^{nd}$ inverter A2 is the output terminal of the deviation current comparator, and the other terminal of the $1^{st}$ capacitor C1 and the other terminal of the $2^{nd}$ capacitor C2 are grounded.

In this embodiment, the threshold voltage of the $2^{nd}$ PMOS transistor P2 is 613 mV, and the threshold voltage of the $9^{th}$ PMOS transistor P9 and the $10^{th}$ PMOS transistor P10 is −487 mV; and other NMOS transistors and other PMOS transistors are all normal-threshold MOS transistors, the threshold voltage of the normal-threshold NMOS transistors is 533 mV, and the threshold voltage of the normal-threshold PMOS transistors is 567 mV.

Figure 6:
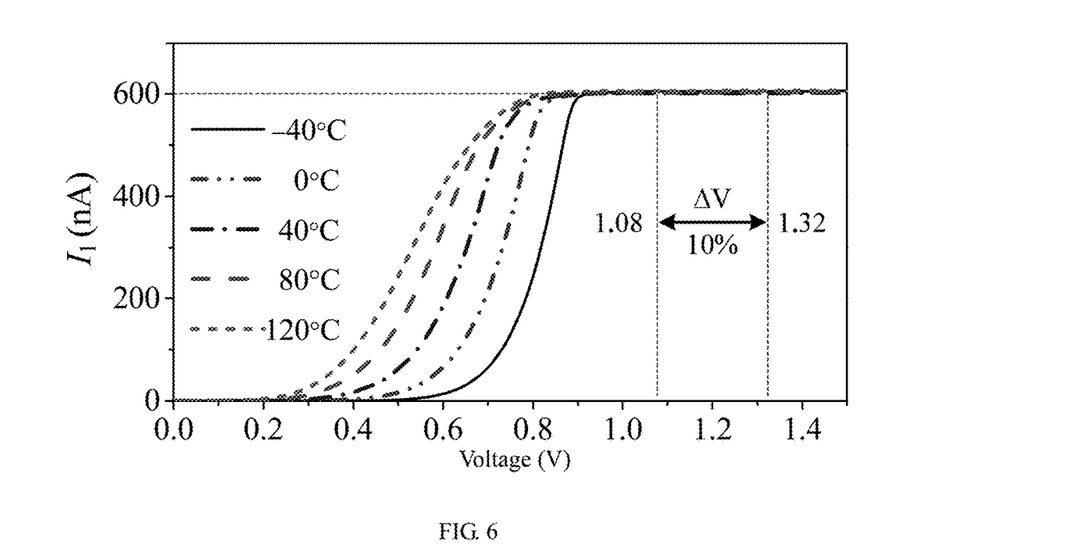
FIG. 6 shows a variation curve of the current produced by the reference current source along with the change of power voltage and temperature of the invention.

FIG. 6 shows the variation curve of the current output by the reference current source along with the change of power voltage and the temperature of the invention. As can be seen from FIG. 6, when the power voltage VDD varies within 1.08~1.32V (the standard voltage is 1.2V) and the temperature varies within −40~120° C., the magnitude of the reference current output by the reference current source hardly varies. The reference current source is simple in circuit structure, without use of capacitor and triode, and capable of outputting the reference current with high robustness.

Figure 7:
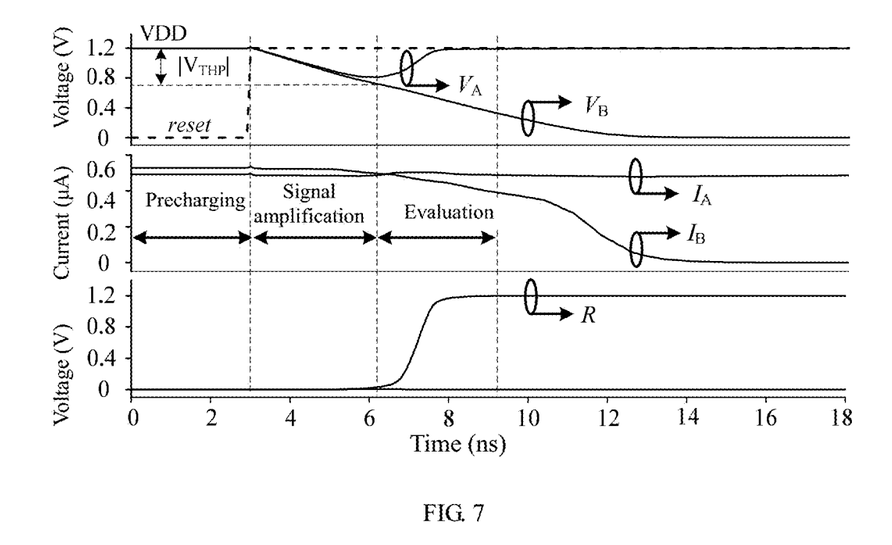
FIG. 7 is a timing simulation diagram of the deviation current comparator of the invention.

FIG. 7 shows the timing simulation diagram of the deviation current comparator of the invention. As can be seen from FIG. 7, in the precharging stage, a node A and a node B are accessed to VDD through an enable signal SAEN, and after the enable signal SAEN reaches a high level, the node A and the node B are released, and the signal amplification stage starts. When currents ($I_A$ and $I_B$) are output from branches on the two sides of the deviation current comparator, the $1^{st}$ capacitor and the $2^{nd}$ capacitor start to discharge, and the higher the discharge currents, the faster the voltages of the nodes on the corresponding sides drop; and the $9^{th}$ responsive PMOS transistor or the $10^{th}$ responsive PMOS transistor will be connected no matter the voltage of which node drops to VDD+$V_{TH}$ first, the evaluation stage starts at the moment, and the deviation current comparator rapidly generates an output response according to positive feedback.

The TSMC-LP 65 nm CMOS process is used for the layout design of the PUF circuit of the invention, parasitic parameters are extracted and Cadence Virtuoso Spectre is used for computer simulation to respectively verify the uniqueness and reliability of the output response, and the power consumption and area of the circuit are evaluated.

The layout of the PUF circuit with the excitation length of 64 bits (m=64) is designed through a full customization method. The layout area of the whole circuit is 38 μm46 μm, the average consumption is 25.7 μW (@100 MHZ), and the static power consumption is 0.65 μW.

Figure 8:
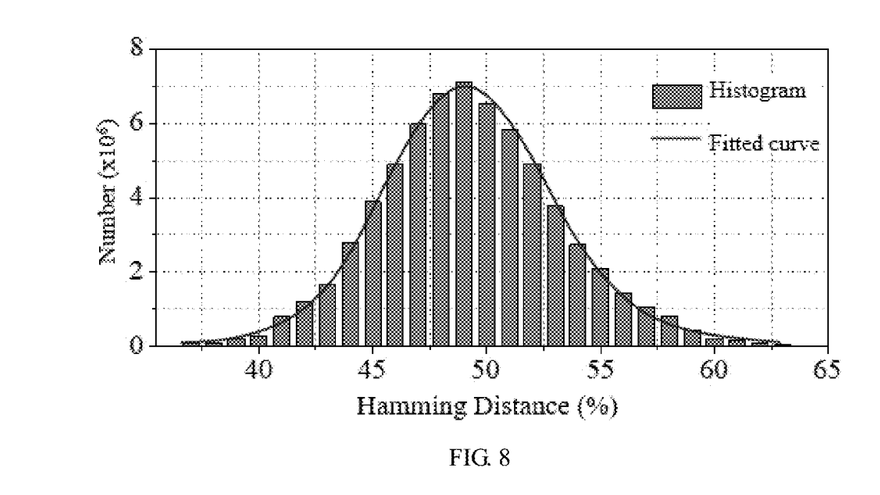
FIG. 8 is an inter-chip Hamming Distance statistical graph of the invention.

FIG. 8 shows the inter-chip Hamming Distance statistical graph of the invention. As can be seen from FIG. 8, the HDs of output responses of different individuals of the PUF circuit of the invention are distributed in a bell shape, and the average inter-chip Hamming Distance $E(HD_{inter})$ is 49.5% and extremely close to the ideal value.

Figure 9:
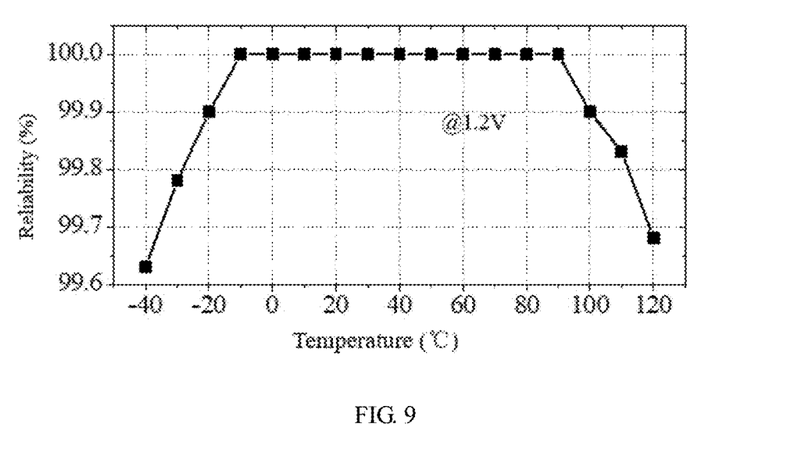
FIG. 9 shows a variation curve of the reliability along with the temperature of the invention.
Figure 10:
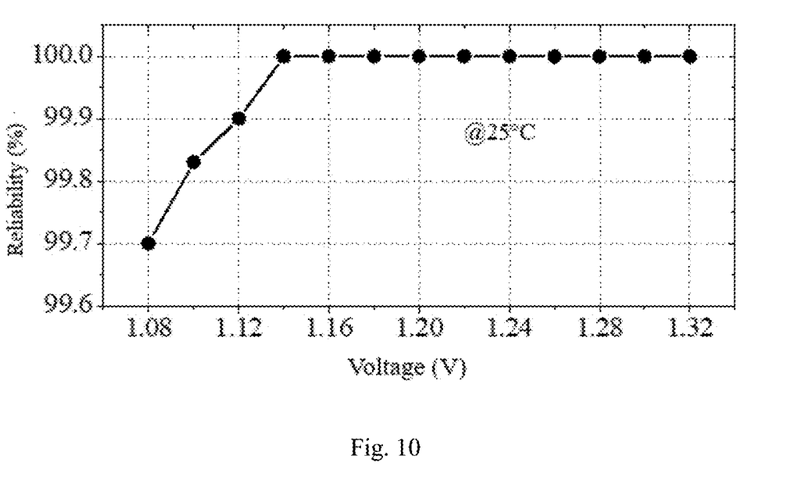
FIG. 10 shows a variation curve of the reliability along with the voltage of the invention.

FIG. 9 shows the variation curve of the reliability along with the change of temperature of the invention, and FIG. 10 shows the variation curve of the reliability along with voltage changes of the invention. As can be seen from FIG. 9, the minimum reliability of the PUF circuit of the invention at different temperatures (−40~120° C.) is 99.6%. As can be seen from FIG. 10, the minimum reliability of the PUF circuit of the invention under different voltages (1.08~1.32V) is 97.7%.

What is claimed is:

1. A current-mode PUF circuit based on a reference current source, characterized in that comprises:
   a timing controller;
   an input register;
   a deviation current comparator; and
   a deviation signal generation circuit;
   wherein the timing controller comprises a clock terminal, a setting terminal, a $1^{st}$ output terminal and a $2^{nd}$ output terminal,
   wherein clock control signals are to be accessed to the clock terminal of the timing controller and setting signals are to be accessed to the setting terminal of the timing controller;
   wherein the input register comprises an enable terminal, an input terminal and m output terminals, and m is an integer greater than or equal to 2;
   wherein the deviation current comparator comprises a power terminal, an enable terminal, a $1^{st}$ input terminal, a $2^{nd}$ input terminal and an output terminal,
   wherein the $1^{st}$ output terminal of the timing controller is connected to the enable terminal of the input register and the $2^{nd}$ output terminal of the timing controller is connected to the enable terminal of the deviation current comparator,
   wherein the input terminal of the input register is the input terminal of the current-mode PUF circuit based on the reference current source and the output terminal of the deviation current comparator is the output terminal of the current-mode PUF circuit based on the reference current source;
   wherein the deviation signal generation circuit comprises a deviation current source array and the reference current source, the deviation current source array is provided with m input terminals, a $1^{st}$ bias terminal, a $2^{nd}$ bias terminal, a $1^{st}$ output terminal and a $2^{nd}$ output terminal, the reference current source comprises a power terminal, a $1^{st}$ output terminal and a $2^{nd}$ output terminal;
   wherein the reference current source comprises a $1^{st}$ PMOS transistor, a $2^{nd}$ PMOS transistor, a $3^{rd}$ PMOS transistor, a $4^{th}$ PMOS transistor, a $5^{th}$ PMOS transistor, a $6^{th}$ PMOS transistor, a $7^{th}$ PMOS transistor, a $1^{st}$ NMOS transistor, a $2^{nd}$ NMOS transistor, a $3^{rd}$ NMOS transistor, a $4^{th}$ NMOS transistor, a $5^{th}$ NMOS transistor, a $6^{th}$ NMOS transistor, a $7^{th}$ NMOS transistor, an $8^{th}$ NMOS transistor, a $9^{th}$ NMOS transistor and a resistor,
   wherein a source terminal of the $1^{st}$ PMOS transistor, a source terminal of the $2^{nd}$ PMOS transistor, a source terminal of the $3^{nd}$ PMOS transistor, a source terminal of the $4^{th}$ PMOS transistor and a source terminal of the $5^{th}$ PMOS transistor are connected, and a connecting terminal is the power terminal of the reference current source, and the power terminal of the reference current source is to be accessed to an external power supply,
   wherein a gate terminal of the $1^{st}$ PMOS transistor, a drain terminal of the $3^{rd}$ PMOS transistor, a gate terminal of the $3^{rd}$ PMOS transistor, a gate terminal of the $4^{th}$ PMOS transistor and a gate terminal of the $5^{th}$ PMOS transistor are connected to first terminal of the resistor,
   wherein a drain terminal of the $1^{st}$ PMOS transistor, a drain terminal of the $1^{st}$ NMOS transistor, a gate terminal of the $1^{st}$ NMOS transistor and a gate terminal of the $2^{nd}$ NMOS transistor are connected, a drain terminal of the $2^{nd}$ PMOS transistor, a gate terminal of the $2^{nd}$ PMOS transistor, the second terminal of the resistor, a gate terminal of the $6^{th}$ PMOS transistor and a gate terminal of the $7^{th}$ PMOS transistor are connected to a drain terminal of the $3^{rd}$ NMOS transistor,
   wherein a drain terminal of the $4^{th}$ PMOS transistor is connected to a source terminal of the $6^{th}$ MPOS transistor, and a drain terminal of the $5^{th}$ PMOS transistor is connected to a source terminal of the $7^{th}$ PMOS transistor,
   wherein a source terminal of the $1^{st}$ NMOS transistor, a drain terminal of the $2^{nd}$ NMOS transistor, a gate terminal of the $3^{rd}$ NMOS transistor and a gate terminal of the $4^{th}$ NMOS transistor are connected to a gate terminal of the $5^{th}$ NMOS transistor, and the connecting terminal is the $1^{st}$ output terminal of the reference current source,
   wherein a source terminal of the $2^{nd}$ NMOS transistor and a drain terminal of the $6^{th}$ NMOS transistor are connected to a gate terminal of the $6^{th}$ NMOS transistor, a source terminal of the $3^{rd}$ NMOS transistor is connected to a drain terminal of the $7^{th}$ NMOS transistor, a source terminal of the $4^{th}$ NMOS transistor is connected to a drain terminal of the $8^{th}$ NMOS transistor, a drain terminal of the $4^{th}$ NMOS transistor, a drain terminal of the $6^{th}$ PMOS transistor and a gate terminal of the $7^{th}$ NMOS transistor are connected to a gate terminal of the $8^{th}$ NMOS transistor, a source terminal of the $5^{th}$ NMOS transistor is connected to a drain terminal of the $9^{th}$ NMOS transistor, a drain terminal of the $5^{th}$ NMOS transistor and a drain terminal of the $7^{th}$ PMOS transistor are connected to a gate terminal of the $9^{th}$ NMOS transistor, and the connecting terminal is the $2^{nd}$ output terminal of the reference current source,
   wherein a source terminal of the $6^{th}$ NMOS transistor, a source terminal of the $7^{th}$ NMOS transistor and a source terminal of the $8^{th}$ NMOS transistor are connected to a source terminal of the $9^{th}$ NMOS transistor, the connecting terminal is the ground terminal of the reference current source, and the ground terminal of the reference current source is grounded,
   wherein the ratio of the width-to-length ratio of the $3^{rd}$ PMOS transistor to the width-to-length ratio of the $4^{th}$ PMOS transistor is 1:1;

wherein the ratio of the width-to-length ratio of the 4$^{th}$ PMOS transistor to the width-to-length ratio of the 5$^{th}$ PMOS transistor is 1:k, and k is an integer greater than or equal to 1;

wherein the ratio of the width-to-length ratio of the 7$^{th}$ NMOS transistor to the width-to-length ratio of the 8$^{th}$ NMOS transistor is 2:1;

wherein the 2$^{nd}$ PMOS transistor is a high-threshold PMOS transistor;

wherein the deviation current source array comprises m deviation current source cells of the same circuit structure and each deviation current source cell comprises a 10$^{th}$ NMOS transistor, a 11$^{th}$ NMOS transistor, a 12$^{th}$ NMOS transistor, a 13$^{th}$ NMOS transistor, a 14$^{th}$ NMOS transistor and a 15$^{th}$ NMOS transistor, wherein a drain terminal of the 10$^{th}$ NMOS transistor is the 1$^{st}$ output terminal of the deviation current source cell, and a drain terminal of the 11$^{th}$ NMOS transistor is the 2$^{nd}$ output terminal of the deviation current source cell;

wherein a gate terminal of the 10$^{th}$ NMOS transistor is connected to a gate terminal of the 11$^{th}$ NMOS transistor, and the connecting terminal is the input terminal of the deviation current source cell; a source gate of the 10$^{th}$ NMOS transistor is connected to a drain terminal of the 12$^{th}$ NMOS transistor; a source terminal of the 11$^{th}$ NMOS transistor is connected to a drain terminal of the 13$^{th}$ NMOS transistor; a gate terminal of the 12$^{th}$ NMOS transistor is connected to a gate terminal of the 13$^{th}$ NMOS transistor, and the connecting terminal is the 1$^{st}$ bias terminal of the deviation current source cell; a source terminal of the 12$^{th}$ NMOS transistor is connected to a drain terminal of the 14$^{th}$ NMOS transistor; a source terminal of the 13$^{th}$ NMOS transistor is connected to a drain terminal of the 15$^{th}$ NMOS transistor; a gate terminal of the 14$^{th}$ NMOS transistor is connected to a gate terminal of the 15$^{th}$ NMOS transistor, and the connecting terminal is the 2$^{nd}$ bias terminal of the deviation current source cell; and a source terminal of the 14$^{th}$ NMOS transistor is connected to a source terminal of the 15$^{th}$ NMOS transistor, wherein the 1$^{st}$ bias terminals of the m deviation current source cells are connected, and the connecting terminal is the 1$^{st}$ bias terminal of the deviation current source array, wherein the 2$^{nd}$ bias terminals of the m deviation current source cells are connected, and the connecting terminal is the 2$^{nd}$ bias terminal of the deviation current source array, wherein the 1$^{st}$ output terminals of the m bias current source cells are connected, and the connecting terminal is the 1$^{st}$ output terminal of the deviation current source array, wherein the 2$^{nd}$ output terminals of the m deviation current source cells are connected, and the connecting terminal is the 2$^{nd}$ output terminal of the deviation current source array, wherein the input terminals of the m deviation current source cells are the m input terminals of the deviation current source array, wherein the 1$^{st}$ bias terminal of the deviation current source array is connected to the 1$^{st}$ the 1$^{st}$ output terminal of the reference current source, and the 2$^{nd}$ bias terminal of the deviation current source array is connected to the 2$^{nd}$ output terminal of the reference current source, wherein the 1$^{st}$ output terminal of the deviation current source array is the 1$^{st}$ output terminal of the deviation signal generation circuit, the 2$^{nd}$ output terminal of the deviation current source array is the 2$^{nd}$ output terminal of the deviation signal generation circuit, the m input terminals of the deviation current source array are m input terminals of the deviation signal generation circuit, the m input terminals of the deviation signal generation circuit are connected to the m output terminals of the input register in a one-to-one corresponding mode, the 1$^{st}$ output terminal of the deviation signal generation circuit is connected to the 1$^{st}$ input terminal of the deviation current comparator, the 2$^{nd}$ output terminal of the deviation signal generation circuit is connected to the 2$^{nd}$ input terminal of the deviation current comparator.

2. A current-mode PUF circuit based on a reference current source according to claim 1, wherein the deviation current comparator comprises an 8$^{th}$ PMOS transistor, a 9$^{th}$ PMOS transistor, a 10$^{th}$ PMOS transistor, a 11$^{th}$ PMOS transistor, a 1$^{st}$ capacitor, a 2$^{nd}$ capacitor, a 1$^{st}$ inverter and a 2$^{nd}$ inverter, wherein the 9$^{th}$ PMOS transistor and the 10$^{th}$ PMOS transistor are both low-threshold PMOS transistors; a source terminal of the 8$^{th}$ PMOS transistor, a source terminal of the 9$^{th}$ PMOS transistor and a source terminal of the 10$^{th}$ PMOS transistor are connected to a source terminal of the 11$^{th}$ PMOS transistor, and the connecting terminal is the power terminal of the deviation current comparator, and the power terminal of the deviation current comparator is to be accessed to the external power supply; a gate terminal of the 8$^{th}$ PMOS transistor is connected to a gate terminal of the 11$^{th}$ PMOS transistor, and the connecting terminal is the enable terminal of the deviation current comparator; a drain terminal of the 8$^{th}$ PMOS transistor, a drain terminal of the 9$^{th}$ PMOS transistor, a gate terminal of the 10$^{th}$ PMOS transistor and an input terminal of the 1$^{st}$ inverter are connected to first terminal of the 1$^{st}$ capacitor, and the connecting terminal is the 1$^{st}$ input terminal of the deviation current comparator; a gate terminal of the 9$^{th}$ PMOS transistor, a drain terminal of the 10$^{th}$ PMOS transistor, a drain terminal of the 11$^{th}$ PMOS transistor and an input terminal of the 2$^{nd}$ inverter are connected to one terminal of the 2$^{nd}$ capacitor, and the connecting terminal is the 2$^{nd}$ input terminal of the deviation current comparator; and an output terminal of the 2$^{nd}$ inverter is the output terminal of the deviation current comparator, and the second terminal of the 1$^{st}$ capacitor and the other terminal of the 2$^{nd}$ capacitor are grounded.

3. A current-mode PUF circuit based on a reference current source according to claim 1, wherein the threshold voltage of the 2$^{nd}$ PMOS transistor is 613 mV.

* * * * *